Patented July 1, 1930

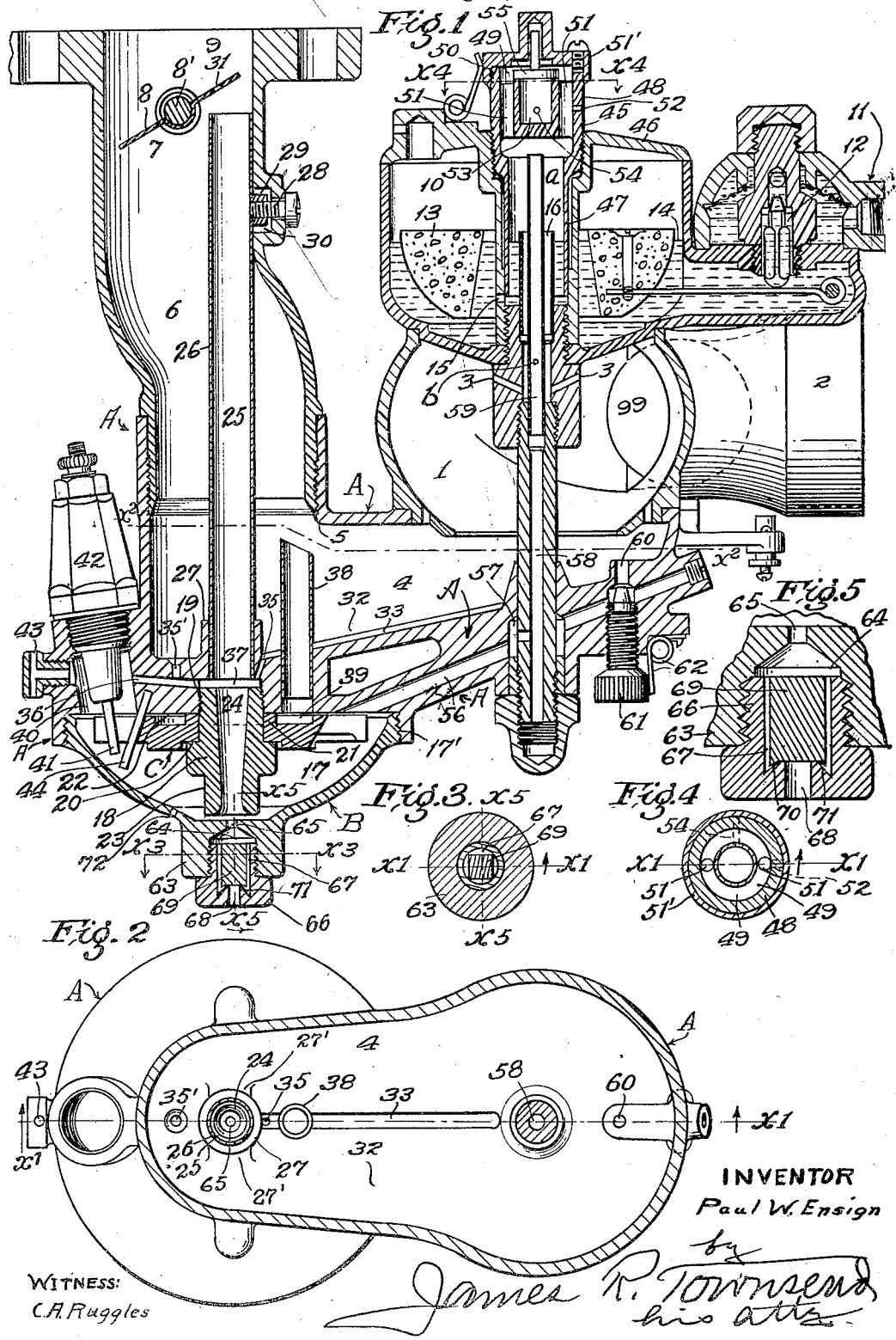

1,769,680

UNITED STATES PATENT OFFICE

PAUL WILFRED ENSIGN, OF SOUTH PASADENA, CALIFORNIA, ASSIGNOR, BY MESNE ASSIGNMENTS, TO ENSIGN CARBURETOR CO., LTD., OF HUNTINGTON PARK, CALIFORNIA, A CORPORATION OF CALIFORNIA

LIQUID-HYDROCARBON VAPORIZER

Application filed August 4, 1924. Serial No. 730,069.

This invention relates to that class of liquid fuel converters set forth in United States Letters Patent to O. H. Ensign, No. 1,408,278, patented Feb. 28, 1922, and in which a mixture of liquid fuel and air is made in predetermined proportions of air to the liquid fuel by a vortical mixer, and passed through a mixture passage under the action of engine suction controlled by throttle means and in which provision is made for vaporizing or gasifying such liquid fuel as may fall to and flow along the floor of the passage into which the mixture is delivered by the vortical mixer, and for delivering such vaporized or gasified fuel to the mixture of air and liquid fuel that passes directly through the mixture passage from the mixer.

An object of this invention is to divert the proper amount of liquid fuel to the combustion chamber of the fuel converter in such a manner that the quantity of fuel delivered to the combustion chamber is not materially affected by the temperature of the mixture.

Another object of the invention is to appropriately supply an extra quantity of liquid fuel to the combustion chamber or gas flue leading therefrom when such extra supply is temporarily required by the performance of the engine.

Another object of the invention is to provide suitable and simple means for controlling the idling mixture of the fuel converter in combination with the fuel feed to the combustion chamber.

Another object is to develop the flow of air and mixture to the combustion chamber, and deliver uncondensed liquid fuel to the gas flue so that at all times all of the fuel reaches the engine manifold fully vaporized.

Another object of the invention is to provide easy means for starting the fuel converter and motor in operation.

Another object is to provide means for supplying a combustion chamber of a fuel converter with fuel which has been proportioned to, but not delivered to the air flowing through the device.

Another object is to automatically regulate the temperature of the final mixture entering the engine manifold during operations under load and in warm weather.

The invention relates particularly to novel means combined with a carburetor for vaporizing liquid hydrocarbon fuels and generating a combustible vapor or gas.

Other objects, advantages and features of invention may appear from the accompanying drawing, the subjoined detail description and the appended claims.

The accompanying drawing illustrates the invention.

Figure 1 is a vertical axial section on line $x^1$—$x^1$, Fig. 2 showing the throttle partly open and the liquid fuel at rest.

Fig. 2 is a horizontal section on line $x^2$—$x^2$, Fig. 1 with the spark plug removed.

Fig. 3 is a horizontal section on line $x^3$—$x^3$, Fig. 1.

Fig. 4 is a horizontal section on line $x^4$—$x^4$, Fig. 1.

Fig. 5 is an enlarged fragmental vertical section on line $x^5$—$x^5$, Figs. 1 and 3.

The invention may be carried out with various types and forms of carburetors or mixing valves or devices that will properly proportion the liquid fuel and the air entering a mixture passage from which a portion of fuel and air is diverted to the place where combustion is effected to produce hot gases.

The lower part of the device comprises a main body A and the combustion chamber bowl B secured to the under side thereof; and the air and liquid fuel mixer or mixing chamber 1, receives air through air inlet 2 and liquid fuel through fuel jets 3 in a well known manner and produces a more or less broken up mixture of liquid fuel and air and discharges such mixture into the horizontal limb 4 of the mixture passage having the downwardly sloping floor 32. Said passage has a sharp upward bend at 5, and extends up through the riser 6, throttle chamber 7 and diffusion chamber 9 to supply combustible mixture to an internal combustion engine, not shown.

The throttle 8 on shaft 8' is arranged as heretofore common, between the throttle chamber 7 and the diffusion chamber 9, in which there takes place throughout the air and liquid fuel mixture, a diffusion of hot products from the combustion chamber to produce by combination with such mixture, produce an oil gas ready for explosive combustion in any suitable place to which it may be directed.

The liquid fuel and air are supplied to the mixing chamber 1 by suitable proportioning means as the constant level liquid fuel chamber 10, and the air inlet 2 operating in conjunction with each other and the engine suction whereby liquid fuel and air are supplied in proportions to produce an explosive mixture: so that the final product issuing from the diffusion chamber 9 is adapted for complete combustion without addition of either air or liquid fuel.

Liquid fuel, such for instance as gasoline, kerosene or other liquid hydrocarbon, is supplied to the liquid fuel supply chamber 10 through the usual liquid fuel connection 11 controlled by the valve 12. A float 13 in the supply chamber co-operates with the valve 12 to maintain the liquid fuel in said chamber at a constant level 14.

Fuel is delivered from the supply chamber 10 through the fuel orifice 15 into the suction chamber $a$ from which liquid fuel flows through a main fuel passage 16 and from which it is delivered to the main air stream of the carburetor through the fuel jets 3.

The bowl B constitutes the bottom of the combustion chamber 17 and is threaded, as at 17' to the body A.

A distributor C within the combustion chamber is supported from the underside of the converter body A by the venturi member 18, which is threaded at 19 into said converter body A and clamps the distributor C between a flange or shoulder 20 on the member 18 and the underside of the converter body.

The distributor C has a central boss 21 which spaces the distributor C from said body to provide a space 22 between the distributor and the roof of the combustion chamber or the underside of the body A.

The member 18 is provided with an extension 23 below the flange 20 and extends nearly to the bottom of the combustion chamber 17 and is provided with a venturi bore 24 that communicates with and forms an extension of the bore 25 of a gas flue 26, which is secured at its lower end in the boss 27 that extends upwardly from the bottom of the mixture passage 4.

Said flue 26 extends upwardly through the riser 6 to a point where its upper end may be closed by the throttle 8 when the throttle is in a closed position. The upper end of the gas flue 26 is retained in assembled position by means of a screw 28 threaded into a boss 29 brazed or welded to said flue, and accommodated in the recess 30 formed in one side of the riser 6.

The throttle valve 8 is provided with a perforation 31 which connects the diffusion chamber 9 with the gas flue 26 when the throttle is closed.

The floor or bottom 32 of the mixture passage 4 is oval-shaped and is provided through the major portion of its length with a drain groove 33 arranged centrally in and at the lowest portion of said floor 32.

The base of the boss 27 is provided at opposite sides with slight lateral extensions as indicated at 27' in Fig. 2, to provide slight dams about $\frac{1}{16}$ of an inch high, projecting transversely a short distance toward the sides of the mixture passage to sufficiently obstruct flow of liquid fuel through the channel 33 above the boss 27 to cause an accumulation of liquid fuel to feed the restricted fuel passage 35 through which said liquid is directed into the upper end of the venturi bore 24. The height and length of said dams are slight, so that only moderate accumulations of liquid fuel may occur to submerge the passage 35 before the liquid will flow around the boss to a secondary restricted liquid fuel passage 35'.

36 is a restricted liquid fuel passage into which the secondary liquid fuel passage 35' discharges, and said passage 36 communicates with an open space 37 formed in the converter body $a$ by the extension above the venturi member 18 of the bore into which said member 18 is screwed; and the primary restricted liquid fuel passage 35 opens into said open space 37 so that liquid fuel may find its way through either or both the passages 35' and 36 into the spark plug recess 40.

A stand pipe 38 that terminates a short distance from bend 5 extends into the mixture passage 4 in front of the restricted liquid fuel passage 35 and connects the mixture passage with an annular groove 39 formed in the upper surface of the distributor C and which communicates with the combustion chamber 17 through the space 22 thereby evenly distributing air and some vaporized fuel around the periphery of the combustion chamber.

A restricted liquid fuel passage 36 extends into a recess 40 from the passage 35' to supply liquid fuel or vapor to a spark plug point 41 of a spark plug 42 mounted in such bore to insure ignition in the combustion chamber 17.

An air admission 43 open to the atmosphere is provided opposite the passage 36 for supplying air to the recess 40 in the region of the spark plug to insure against too rich a mixture which would prevent ignition.

An electrode 44 is provided with which the spark plug point 41 forms a spark gap.

An adjusting sleeve 45 is threaded into the cover 46 and has a tubular extension 47 to adjust the liquid fuel orifice 15 and also has a solid head 48, the top of which is recessed at 49 and is threaded at 50 to receive a cap 51' which forms a chamber of the recess, passages 51 are formed in the head 48 and connect the chamber 49 with the suction chamber $a$. Said passages 51 are directly open to the atmosphere through the air admission 52 thereby providing a constant admission to the suction chamber $a$. A pocket 53 is formed in the head 48 and is open to the atmosphere through an additional air admission 54 and to the chamber 49 under control of a gravity valve 55, thereby providing means for a secondary air admission to the suction chamber $a$ during load conditions.

Due to the restricted openings into the combustion chamber and the relatively free flow therefrom through the gas flue 26 the combustion chamber is at all times under a slight suction which is utilized to assist in producing combustible mixtures for low speed when the throttle is closed or substantially closed. This suction or depression is applied to the suction chamber $a$ through an idling by-pass comprising an inclined passage 56, annular chamber 57, and suction passage 58 which is extended by tube 59 that opens into the suction chamber $a$ well above the fuel passage 16 which is slightly above the constant level 14.

The depression applied to the suction chamber through the idling by-pass is vented by a valved vent 60 which opens from the mixture passage into the inclined passage 56. The vent 60 is controlled by a valve 61 which is held in position by a spring 62.

The idling by-pass is provided with one or more fuel orifices $b$ which open into the fuel passage 16, to receive unvaporized liquid fuel therefrom and divert such fuel through the idling by-pass to the combustion chamber after the fuel has been proportioned to the air but before it is delivered to the main air stream.

The lower portion of the member B is provided with a boss 63 provided with a bore 64 open to the combustion chamber through a nozzle 65 which is located axially relative to the gas flue 26 and discharges into the venturi 24 of the gas flue extension. A valve seat member 66 is threaded into the bore 64 and has a chamber 67 therein open to the atmosphere through the port 68. A gravity valve 69 of square cross section is mounted in the chamber 67 and has a cupped seat 70 which seats upon an upwardly pointed conical seat 71 formed in said chamber 67.

The upper end of the bore 64 is conical as at 71 so that when the valve 69 is raised air may freely pass the upper end of the square valve 69.

A vent 72 provides a drain for the combustion chamber.

In starting the apparatus into operation, the choke 99 is closed tight to start the liquid fuel flowing through the carburetor element, and such fuel will flow from the jets 3 and fall to the floor of the mixture passage 4 because the air inlet 2 is closed and the usual air stream is not present to carry the fuel past the throttle 8 which in starting is usually only partially open. Such fuel as above set forth will flow into the gas flue through the fuel passage 35, 35', and chamber 37. The suction created in the device, by cranking of the engine, will at the same time raise the starting valve 69 from its seat and a jet of air will issue from the nozzle 65 and enter the venturi 24 from which it passes on through the gas flue 26. Such jet of air acts upon the fuel discharged into the gas flue 26 from the passages 35, 35', and violently projects it therethrough into the diffusion chamber 9 where it is delivered to the main mixture at the throttle and from which it flows to the engine manifold to which the apparatus is attached, and thus supplies an appropriate mixture for starting the engine.

After the engine is started the choke 99 is released and normal operation of the apparatus follows, that is to say, the suction is removed from the valve 69 which then falls by gravity onto its seat and closes the inlet 68 thereby stopping the issuance of air from the nozzle 65; and the main air stream entering the mixing chamber 1 through the air inlet 2 produces a properly proportioned mixture of air and fuel for use in internal combustion engines. Such mixture is emitted from the mixing chamber 1 into the horizontally downwardly inclined mixture passage 4, where under all conditions of operation more or less of the heavier portions of the liquid fuel will condense and accumulate on the floor 32 of the mixture passage 4.

The lighter portions of the atomized fuel and air will continue through the mixture passage 4 around the elbow or bend 5, thence upward through the riser 6, past the throttle 8, and into the diffusion chamber 9.

Fuel and air are delivered to the combustion chamber 17 through the idling by-pass 56 and the stand pipe 38, respectively, as will be more fully hereinafter described; and is ignited by the spark formed between the electrode 44 and the point 41 of the spark plug 42, which is connected by a circuit, not shown, to a spark coil.

Simultaneously with the foregoing operation the suction of the engine and the flow of the main air stream will create a draft in the gas flue 26 and a resultant depression in the combustion chamber 17, and such draft will draw the hot gases from the combustion chamber into the diffusion chamber; and such hot gases are substituted for the air jet emitted from nozzle 65.

The liquid fuel accumulated on the floor 32 will flow by gravity down the more or less oval-shaped passage 4 into the groove 33 from which it flows through the restricted fuel passage 35 directly into the gas flue 26, where it is immediately vaporized by hot gases flowing therethrough. In case liquid fuel is accumulated behind such slight dam extensions 27' in sufficient quantity, to flow around such slight dams 27', it will then flow down through the secondary fuel passage 35' into the gas flue 26, and thence in either direction so as to reach the spark plug recess on one side and the gas flue 26 on the other side.

The idling mixture of air and vaporized liquid fuel is controlled by means utilizing the depression from the engine side of the throttle for producing a draft in the combustion chamber to vary the suction in the suction chamber $a$ through the idling by-pass 56. The depression which reaches the chamber $a$ may be adjusted by means of the valve 61 controlling the chamber vent 60. It has been found that it is necessary on some motor cars to carry a larger air admission in the suction chamber under load than it is practical to keep open during idling therefore such admission has been divided up so that there is a desirable admission for idling such as the air bleed 52, and an additional admission 54 is controlled by the gravity valve 55 which is not open at engine idling speed but opens at some desirable predetermined load. The amount of fuel and air which may enter the adjusting air admission 60 that is utilized to adjust the idling mixture is very small and is of the same character as that which enters the stand pipe 38 being only a portion of the mixture of air and fuel delivered to the combustion chamber. It is therefore seen that an important part of this invention is the obtaining of the fuel from the mixture passage through the idling by-pass where it may be more or less under the control of the idling mixture adjustment by means of the valve 61 and is only moderately affected by temperature.

At all times a mixture of air and vaporized liquid fuel is supplied to the combustion chamber through the stand pipe 38, groove 39, and space 22 from which it flows in an even thin stream around the periphery of the distributor C and around the periphery of the combustion chamber.

After a short time of operation the apparatus begins to warm up and the heavy ends of the liquid fuel contacting with the now hot surfaces of the mixture passage 4 will be vaporized by such contact and some vaporized fuel will flow through the stand pipe 38 and the adjusted admission 60 and enter the combustion chamber, thereby tending to make the mixture in the combustion chamber, rich in fuel thereby smothering the flame and thus limiting the temperature of the final mixture entering the diffusion chamber when the engine is working under load and also in warm weather.

The larger portion of all the fuel that is supplied to the combustion chamber is taken from the fuel passage, after the fuel has been proportioned and before it is delivered to the main air stream, and flows through the limiting orifices $b$ thence through the idling by-pass to the combustion chamber.

Due to the restriction at the lower end of the venturi 24 the preponderance of the suction in the gas flue 26 insures delivery to the gas flue through the passages 35, 35', of practically all unvaporized fuel.

The advantage of supplying the liquid fuel to the combustion chamber through the orifice $b$ is that the fuel is not heated at this point in comparison with any heat near the combustion chamber, as the fuel at the orifice $b$ is only effected by the temperature of the incoming air.

It is therefore practical by this means to more definitely control the amount of fuel that reaches the combustion chambers and at all times be sure of desirable clean combustion therein.

I claim:

1. A combined carburetor and vaporizer for vaporizing hydrocarbon fuel, comprising a gas mixture passage, a combustion chamber; a liquid fuel passage adapted to supply fuel to said mixture passage; a liquid fuel vaporizing element communicating with said liquid fuel passage; a throttle to control said mixture passage; a gas passage from said combustion chamber controlled by said throttle; restricted fuel passages adapted to deliver liquid fuel from said gas mixture passage to said last mentioned passage; a nozzle adapted to discharge a jet of air into said gas mixture passage; and a gravity valve to control the flow through said nozzle.

2. A combined carburetor and vaporizer for vaporizing hydrocarbon fuel, comprising a gas mixture passage, a combustion chamber; a liquid fuel passage adapted to supply fuel to said mixture passage; a liquid fuel vaporizing element communicating with said fuel passage; a throttle to control said mixture passage; a gas passage from said combustion chamber controlled by said throttle; restricted fuel passages adapted to deliver liquid fuel from said gas mixture passage to said last mentioned passage; and means whereby atmospheric air is admitted to said gas mixture to project through said gas mixture passage, the liquid fuel delivered thereto through the restricted liquid fuel passages.

3. A combined carburetor and vaporizer for vaporizing hydrocarbon fuel, comprising a carburetor element adapted to proportion a mixture of air and liquid hydrocarbon fuel; a body member having a mixture passage to receive mixture from said carburetor element; a liquid fuel vaporizing element; a throttle to control said mixture passage; a combustion chamber secured to the under side of said body member; a distributor spaced from the under side of said body member; an auxiliary member threaded into said body member and having a flange adapted to clamp said distributor between the under side of said body member and said flange; said auxiliary member having a bore; and a gas flue having a bore communicating with the bore in said auxiliary member and adapted to be controlled by said throttle.

4. A combined carburetor and vaporizer for vaporizing hydrocarbon fuel, comprising a combustion chamber; means for supplying liquid hydrocarbon fuel to said combustion chamber; a gas distributor spaced from the top of said combustion chamber and provided with a groove; a liquid fuel vaporizing element; means for admitting air to said groove; said groove being open and in communication with said combustion chamber through the space between the distributor and the roof of the combustion chamber, and a gas flue provided with an extension adapted to receive the products of combustion in said combustion chamber at the bottom thereof.

In testimony whereof, I have hereunto set my hand at Los Angeles, California, this 29th day of July, 1924.

PAUL WILFRED ENSIGN.